Dec. 19, 1944.  W. E. MAREK  2,365,202
PROCESS OF MAKING FERRIC HYDRATE
Filed June 14, 1941
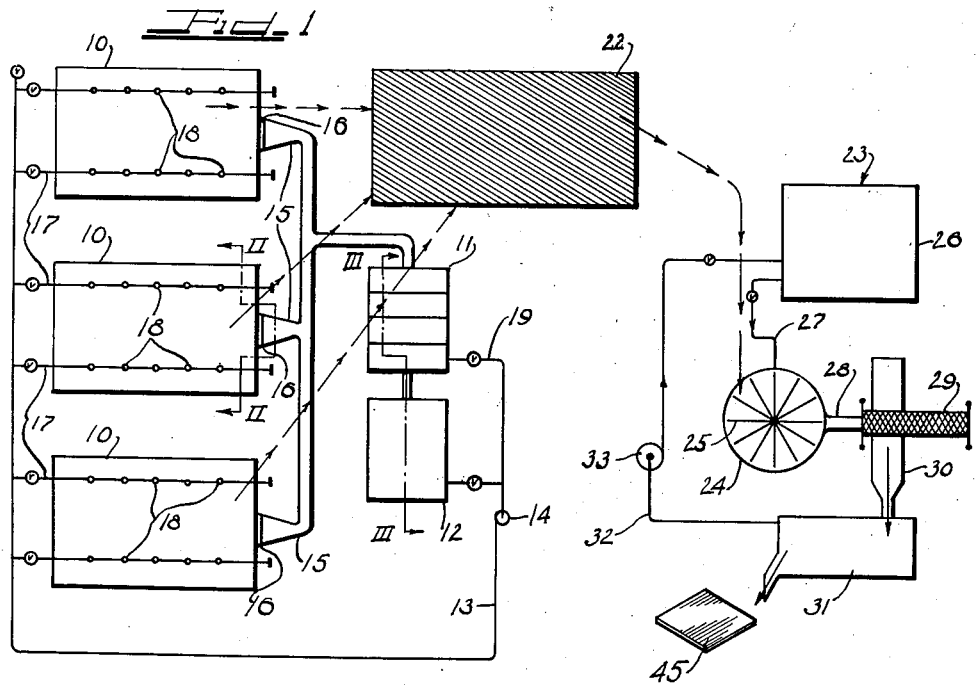
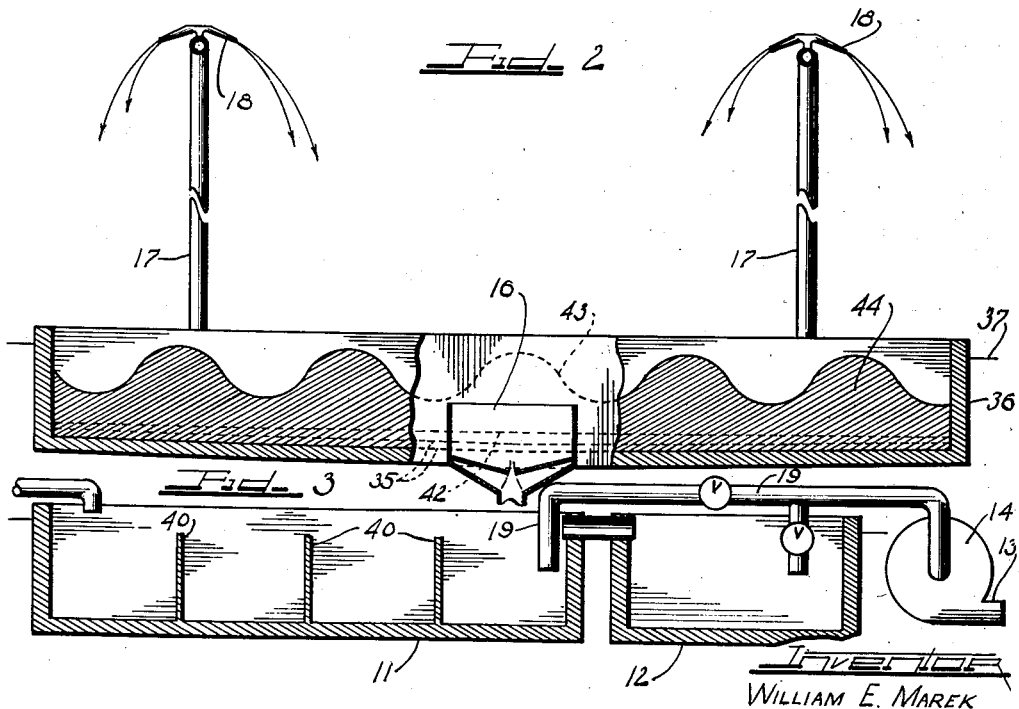
Inventor
WILLIAM E. MAREK Patented Dec. 19, 1944

2,365,202

UNITED STATES PATENT OFFICE 2,365,202

PROCESS OF MAKING FERRIC HYDRATE

William E. Marek, Chicago, Ill., assignor to Connelly Iron Sponge & Governor Co., Chicago, Ill., a corporation of New Jersey Application June 14, 1941, Serial No. 398,029

11 Claims. (Cl. 23—200)

This invention relates to a method of preparing ferric hydrate adapted for the removal of hydrogen sulfide from liquid or gaseous media.

Many iron oxides and hydrates have been used for hydrogen sulfide removal, including natural iron ores such as limonite, bog ore, sulfur mud, hydrated iron ore, and the like. Processed ores have also been employed, in particular, decomposition products of the ferrites and ferrates of the alkali metals and of the alkaline earth metals. Precipitates obtainable as by-products on neutralization or other chemical treatment of iron salt solutions have also been used.

Of greatest importance, however, are the oxidation products of metallic iron or of iron salts that are prepared by methods including treatments with combinations of acids or acid salts and oxidizing agents, to form, by effecting solution of the iron, ferrous or ferric salts from which ferric hydrate can be precipitated by hydrolysis or neutralization. The present invention pertains particularly to methods on this order that employ metallic iron as a starting material and especially to the so-called field method wherein a layer of finely divided moist iron or the like is exposed to the atmosphere.

Iron hydrate has heretofore been prepared from metallic iron by the field oxidation system which provides an area of ground exposed to the atmosphere and surfaced with a suitable material such as concrete. This area, which hereinbelow will be referred to as a field, is equipped with suitable drainage and sprinkling systems to provide adequate moisture control at all times. Finely powdered iron (preferably 50 mesh or finer) mixed with a carrier such as wood shavings or saw dust to form a material containing from ten to twenty pounds of metallic iron per bushel is spread over the field to a depth of about six to twelve inches. Ferrous sulfate may be added to the mixture in a concentration of from one to three pounds per bushel. The mixture is then wetted thoroughly. The initial pH of the wetted mixture is about 3. The oxidation of the iron proceeds rapidly with generation of heat and formation of blue ferrous hydrate which quickly changes over to brown ferric hydrate on exposure to the atmosphere. The field is plowed or agitated from time to time to dissipate the heat generated as well as to expose fresh surfaces to the atmosphere.

Some variations in this method have been introduced with a view to improving the quality of the hydrate produced. Continuous sprinkling has been applied with the thought that this would carry more oxygen into intimate contact with the iron. Such excess water will prevent overheating and thereby the formation of magnetic oxide unsuited for hydrogen sulfide removal but will not supply a quantity of oxygen sufficient by itself to oxidize all the iron, as will be made evident by the calculations of the following paragraph.

The desired final product has the formula $Fe_2O_3.3H_2O$ representing a composition including 52.26 percent iron, 22.46 percent oxygen, and 25.28 percent combined water. In other words, every 2000 pounds of hydrated ferric oxide or every 1500 pounds of $Fe_2O_3$, or every 60 bushels of field sponge containing 25 pounds $Fe_2O_3$ per bushel, comprise 1045 pounds iron, 449 pounds oxygen, and 506 parts combined water. Thus, for every 60 bushels of sponge, 449 pounds of oxygen must be removed from the atmosphere and must be introduced into the oxidation system. This amount of oxygen is equivalent to 5033 cubic feet of pure oxygen at 32° F. and a pressure of one atmosphere, or to 27,815 cubic feet of air under the same conditions. A field containing 3000 bushels of sponge would require 22,450 pounds of pure oxygen. The solubility of oxygen in water at 20° C. or 68° F. and a total pressure (sum of partial pressures of water vapor and oxygen) of 760 mm. of mercury amounts to 0.004339 gram of oxygen present for every 100 grams of water, or about 0.004 percent oxygen by weight, or about 4 parts in 100,000. If oxygen dissolved in water were relied upon exclusively to supply the necessary oxygen for a field of 3000 bushels of sponge, it would be necessary to pump 280,600 tons of water on the field during the period of oxidation, assuming that the dissolved oxygen were utilized with 100 percent efficiency. This amount equals approximately 70,000,000 gallons of water and, if applied continuously for fifteen days, would have to be supplied at a rate of 120,000 gallons per hour. Such amounts are, of course, utterly impractical in connection with a field of 3000 bushels.

Another modification of the conventional method includes an addition of lime or other alkali, in amounts of about ⅓ pound CaO for every pound of ferrous sulfate in the field sponge. This amount is not sufficient to neutralize the ferrous sulfate or even appreciably to alter the pH of 3 which normally obtains at the beginning of the oxidation. The chief advantage flowing from the addition of lime is the ultimate formation of certain amounts of very active ferric hydrate in the field sponge which, however, represent only a very small portion of the total iron oxide formed.

These modifications have not cured certain defects inherent in the prior art method. One of these defects is the tendency of the field material to turn dark due to formation of magnetic oxide when the sponge is a week old or less. Another drawback is the tendency to form material which lacks the ability to react with traces of hydrogen sulfide.

I have now found that if the pH of the field material is maintained at between 4.3 and 7.0, or, more specifically, between 4.5 and 6.5, throughout the treatment period, the oxidation of the iron will proceed smoothly, without formation of inert material such as magnetic oxide, to yield a final product that is distinguished by superior ability to remove hydrogen sulfide even in traces. Such pH maintenance may be effected by buffer salts, in particular, ferrous ammonium sulfate.

It is therefore an important object of the present invention to provide an improved method of oxidizing metallic iron to ferric hydrate comprising maintaining the field sponge or iron mixture neutral or faintly acid.

Other and further objects of this invention will become apparent from the following description and appended claims.

The working of the invention will be made more clear by the explanatory hypotheses stated hereinbelow. It should be understood, however, that the merits of the invention are not dependent on the correctness of the explanatory hypotheses.

The oxidation of iron takes place in two stages, terminating, respectively, in the formation of ferrous and ferric compounds, as expressed by the following formulae:

(1) $Fe \rightarrow Fe^{++} + 2e$ (2) $Fe^{++} \rightarrow Fe^{+++} + e$

The initial oxidation is effected at an electrode potential of −0.40 volt; the second oxidation, at an electrode potential of +0.75 volt.

Metallic iron can be successfully oxidized only in the presence of moisture. The oxidation of iron to ferrous hydrate by water takes place as indicated by the following formulae:

(3) $2H_2O \rightarrow H_3O^+ + \overline{OH}$ (4) $2H_3O + Fe \rightarrow Fe^{++} + 2H' + 2H_2O$ (5) $Fe^{++} + 2(\overline{OH}) \rightarrow Fe(OH)_2$ The water first hydrolyzes to form oxonium ions $H_3O^+$ and hydroxyl ions. The oxonium ions react with iron to form ferrous iron ions and monatomic hydrogen. The ferrous ions react further with the hydroxyl ions to form slightly soluble ferrous hydroxide.

The initial oxidation of the iron is thus facilitated by the presence of oxonium ions, as in water having a distinct acidity.

The decomposition of the oxonium ions occurs at a potential of 0.00 volt. This reaction is therefore not available to oxidize ferrous iron to ferric iron even at low pH values, especially in the presence of metallic iron, which tends to be oxidized preferentially. The only practically available oxidation-reduction system distinguished by a positive potential above 0.75 is the one involving the reduction of oxygen gas to oxygen ions at a potential of +1.9 volts. The oxidation of ferrous iron by means of oxygen is illustrated by the following formulae:

(6) $O_2 + 3H_2O \rightarrow O_3 + 2\overset{+}{H_3O} + 2e$ (7) $O_3 + H_2O \rightarrow H_2O_2 + O_2$ (8) $H_2O_2 + 2Fe^{++} \rightarrow 2Fe^{+++} + H_2O + O^=$ (9) $O^= + H_2O \rightarrow 2(\overline{OH})$

(10) $Fe^{+++} + 3(\overline{OH}) \rightarrow Fe(OH)_3$ (10a) $\overset{+}{H_3O} + e \rightarrow H_2O + H'$ Oxygen first combines with water to form ozone and oxonium ions, leaving a surplus of two electrons that at pH 4.3 and upward combine with an oxonium ion to release monatomic hydrogen. The ozone reacts with additional water to form hydrogen peroxide and oxygen, which again reacts with water, as stated hereinabove. The hydrogen peroxide reacts with ferrous ions to form ferric ions, water, and oxide ions that react with additional water to form hydroxyl ions that in their turn react with the ferric ions to form insoluble ferric hydroxide.

The presence of metallic ions or of an excess of hydroxyl ions will remove oxonium ions and thus shift the equilibrium from left to right in the reaction of Equation 6. Equations 6 to 10 may be summarized as one equation, as follows:

(11) $3O_2 + 6H_2O + 4Fe^{++} \rightarrow 4Fe(OH)_3$

According to the law of mass action, the reaction of Equation 11 will proceed from left to right until equilibrium is established as determined by the solubility constant of ferric hydroxide. Since ferrous hydroxide has a solubility product constant of $1.64 \times 10^{-14}$ at 18° C., practically all the ferrous ions can be expected to be oxidized to ferric ions before equilibrium is established. More oxygen is then absorbed from the atmosphere to maintain the initial oxygen concentration, and more ferrous ions are formed by the oxidation of metallic iron, to replace the ferrous ions oxidized, so that a continuous reaction is set up.

In brief, continuous oxidation of metallic iron to ferric hydrate takes place as an initial oxidation of the metallic iron to the ferrous state by oxonium ions in acid water and a subsequent oxidation of ferrous iron to the ferric state by dissolved oxygen. On the field, of course, the two reactions occur simultaneously as the iron gradually is attacked.

As indicated by Equation 4, the oxidation of metallic iron is accompanied by a liberation of hydrogen. At pH values below 4.3, this hydrogen will be liberated as a gas, which coats the metal particles with protective films. Particles thus coated are said to be passive and are not easily oxidized.

At pH 4.3 or higher, hydrogen is liberated as monatomic hydrogen which reacts with oxygen, thus causing more rapid adsorption of oxygen, and with metallic iron to form hydroxyl ions effective to remove ferrous ions from the system as follows:

(12) $2H' + O_2 + Fe \rightarrow Fe^{++} + 2(\overline{OH})$

(13) $Fe^{++} + 2(\overline{OH}) \rightarrow Fe(OH)_2$

At pH 7 or higher, of course, the oxidation of metallic iron is retarded due to a diminution in the number of oxonium ions present.

Too low or too high pH values thus retard the oxidation of metallic iron.

In the oxidation of ferrous iron to the ferric state, equal proportions of ozone and oxonium ions are formed, as indicated by Equation 6. It is known that at acid pH values considerable amounts of oxonium ions are present. As can be predicted from the law of mass action, an excess of oxonium ions will suppress the reaction of Equation 6 from left to right and in extreme cases actually reverse the reaction, to form water, monatomic hydrogen and oxygen, as follows:

(14) 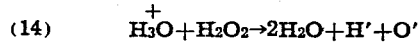

Such a change in the system results in the loss of some of its oxidizing power. At pH values below 4.3, any hydrogen formed may be liberated as a passivating gas, with the results indicated hereinabove.

A low pH value, particularly one below 4.3, thus retards the oxidation of ferrous iron to the ferric state. Ferrous iron will thus tend to accumulate until, by the law of mass action, the solution of metallic iron is inhibited.

Low pH values also have other undesirable effects, such as formation of a basic sulfate $FeOHSO_4$ which not only is totally incapable of absorbing hydrogen sulfide but actually inhibits such adsorption. When, due to high acidity, the oxidation of ferrous iron to the ferric state is retarded, and considerable amounts of ferrous compounds have accumulated, and when, as in the prior art methods, sulfate ions are introduced into the system, a basic sulfate will be formed as indicated in the following equation:

(15) 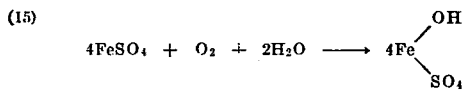

The inert anhydrous protoxide of iron FeO may also be precipitated from a highly acid concentrated solution of ferrous iron.

An alkaline condition also induces the formation of undesirable products. Such conditions promote the oxidation of metallic iron by ferric ions yielding large amounts of ferrous iron which in an alkaline medium forms inert black oxide $Fe_3O_4.4H_2O$. More particularly, the concentration of ferrous ions becomes so great that oxygen cannot be adsorbed rapidly enough to convert the ferrous iron into ferric hydrate. Since ferrous hydrate is much more soluble than ferric hydrate, more iron will remain in the system in a reactive condition. The unstable intermediate ferroso-ferric hydrate then breaks down to form inert dark colored oxides. The probable reactions involve a molecular rearrangement and may be expressed by the following equation:

(16) 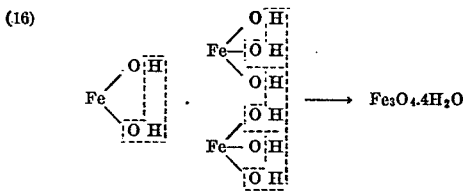

$Fe_3O_4.4H_2O$ is a black oxide inoperative for gas purifying purposes. Heat greatly increases its rate of formation. Ultimate dehydration occurs with the formation of anhydrous $Fe_3O_4$ which is found in nature as magnetic iron ore or magnetite.

The prior art oxidation described hereinabove starts with an initial pH of 3 and gradually turns alkaline. The initial low pH explains why the prior art method tends to produce material having low hydrogen sulfide adsorbing power, for a low pH would produce basic sulfate that inhibits such adsorption. The alkaline condition prevailing subsequently is most likely the reason for the formation of dark material containing $Fe_3O_4.4H_2O$ in the prior art process.

The presently disclosed pH range of from 4.3 to 7.0 or from 4.5 to 6.5 will avoid the formation of any undesirable by-products while favoring both the oxidation of metallic iron by oxonium ions and the oxidation of ferrous iron by dissolved oxygen. A pH range of approximately 5 to 6.5 is preferred.

The desired pH conditions can be maintained by the addition of acid but are preferably maintained by means of more or less acidic buffer salts such as salts of weak bases and strong acids. Obviously the basic constituent of the buffer salt should be stronger than the ferrous or ferric hydroxides. Since the hydroxides of all the heavy metals are extremely weak, their salts are likely to effect pH values below 5. Aluminum sulfate, for instance, produces a pH value of 3. Salts of the alkaline earth metals and alkali metals produce approximately neutral conditions on hydrolysis and are therefore as a rule not effective buffers in field sponge oxidation.

Alums containing sodium or potassium produce pH values on the same order as the corresponding salts of the heavy metal constituents of the alums, since the alkali metals produce almost neutral solutions. $Al_2(SO_4)_3.2K_2SO_4.24H_2O$, for instance, effects a pH of 3. Many ammonium alums, however, having the general formula $R_2(SO_4)_3.(NH_4)_2SO_4.24H_2O$ wherein R may be aluminum, iron, chromium, manganese or other heavy metal, yield pH values between 4.5 and 6.5. Some pseudo alums are also effective.

In place of ammonium alums, similar combinations of sulfates of organic amines with heavy metal sulfates can be used satisfactorily, for instance, those listed hereinbelow:

| | Ionization constants |
|---|---|
| Methylamine, $CH_3NH_2$ | $5 \times 10^{-4}$ at 25° C. |
| Ethylamine, $C_2H_5NH_2$ | $5.6 \times 10^{-4}$ at 25° C. |
| Secondary butyl amine, $C_4H_9NH_2$ | $7.2 \times 10^{-4}$ at 25° C. |
| Diethyl benzyl amine, $C_{11}H_{15}NH_2$ | $3.6 \times 10^{-5}$ at 25° C. |
| Hydrazine $N_2H_4.H_2O$ | $3 \times 10^{-6}$ at 25° C. |
| Pyridine, $C_5H_5N$ | $2.3 \times 10^{-9}$ at 25° C. |

All these bases have ionization constants close to that of ammonia, which amounts to $1.8 \times 10^{-5}$ at 25° C.

Certain nitrates of heavy metals are also operative, for instance, nickel nitrate.

An examination of the electromotive series indicates that the formation of ferrous iron from metallic iron is best effected in the presence of metal ions lying between iron and hydrogen in the series. The electromotive series is reproduced hereinbelow:

| | |
|---|---|
| Mn to $Mn^{++}$ | 1.100 |
| Zn to $Zn^{++}$ | .7618 |
| Cr to $Cr^{++}$ | .557 |
| Fe to $Fe^{++}$ | .441 |
| Co to $Co^{++}$ | .278 |
| Ni to $Ni^{++}$ | .231 |
| Sn to $Sn^{++}$ | .136 |
| Pb to $Pb^{++}$ | .122 |
| Fe to $Fe^{+++}$ | .05 |
| $H_2$ to $H^+$ | 0.000 |

Zinc and chromium salts have actually been found to give poor results.

Ferric salts, of course, may be reduced by metallic iron and are therefore not desirable. Ferric sulfate, for instance, is reduced to ferrous sulfate which tends to be reduced further to ferroso-ferric hydrate under the influence of heat.

The end product is almost invariably a dark or black crystalline form of $Fe_2O_3$ or $Fe_3O_4$.

Ferrous sulfate effects a pH of 3 and shows unstable oxidation tendencies.

Aluminum sulfate is characterized by a slow reaction rate and negative catalytic effects on the activity of the finished product.

Manganous sulfate has a pH of 5.2 but retards oxidation.

Zinc sulfate effects a pH of 5.2 but produces an oxidation rate considerably slower than that of ferrous sulfate.

Sodium and potassium chlorides yield approximately neutral solutions. Oxidation is not retarded by these salts, and oxides of medium activity are produced that, however, tend to reduce or crystallize during the early stages of oxidation.

Nickel salts such as nickel sulfate have a pH of 5.8 to 6. Ferric hydrate does not begin to form until from 24 to 48 hours after a sponge has been prepared with a nickel salt. The resultant product is a yellowish green hydrate of doubtful activity.

Magnesium sulfate is almost inert as an oxidation promoter.

Ammonium chloride promotes rapid oxidation but the resultant ferric oxide has a tendency to be unstable, reverting to a dark red anhydrous crystalline variety of poor activity.

Ammonium sulfate is an acid salt, but oxidation in its presence is not as rapid as might be expected, the product becoming more or less passive after a few hours. The hydrate eventually reverts to a black crystalline variety of $Fe_2O_3$.

Thus, although a number of normal or double salts will produce the desired pH range of from 4.5 to 6.5, very few salts are operative, undesirable side reactions and other effects rendering most of the otherwise acceptable salts inoperative.

The most effective buffer salts are the ammonium- or amine-ferrous iron double salts and some pseudo-alums containing ferrous iron. These ammonium and amine salts do not introduce any cationic impurities into the sponge and do not tend to form the undesirable end products obtained with ferric salts such as ferric sulfate.

The buffer salts may be added in solid or dissolved form.

Ferrous ammonium sulfate has been found satisfactory in all respects, and is also quite inexpensive. Crude ferrous sulfate salt residues and ammonium sulfate by-product salts from coke oven plants can be mixed in approximately equal proportions to yield the double salt.

Ferrous ammonium sulfate gives a pH of about 5.8 and causes powdered iron to yield a ferric hydrate of reddish brown color. During the first stages of the oxidation considerable blue hydrate forms which greatly discolors the drainage water with the characteristic blue color of colloidal ferroso-ferric hydrate. After several days of oxidation the pH of the field shifts toward the neutral point unless ferrous sulfate or the like is added in amounts sufficient to maintain the desired pH. If considerable heat is present in the sponge, the pH may go as high as 9 or 10 and the odor of free ammonia gas will be evident. This odor is a warning sign, for when conditions prevail such that free ammonia is evolved, ferrous irons have been eliminated practically completely from the system by hydrolysis and precipitation. At such pH values the ferroso-ferric hydrate is seriously reduced with the ultimate development of protoxide of iron as the end product.

The shift in pH can be explained by the following series of equations:

(17) $(NH_4)_2Fe(SO_4)_2 \rightarrow 2\overset{+}{NH_4} + Fe^{++} + 2SO_4^{=}$

(18) $\overset{+}{NH_4} + 2HOH \rightarrow NH_4OH + H_3O^+$

(19) $\overset{+}{H_3O} + Fe \rightarrow Fe^{++} + H_2O + H^N$

(20) $2H^N + O_2 + Fe \rightarrow Fe^{++} + 2\overset{-}{(OH)}$

The ferrous ammonium sulfate is first ionized. A formation and elimination of oxonium ions thus occurs which causes a rise in pH. Equilibrium is not established until most of the ferrous ions have been precipitated as ferrous or ferric hydroxide. Such precipitation causes removal of hydroxyl ions formed by the interaction of monatomic hydrogen, dissolved atmospheric oxygen, and free metallic iron, leaving only un-ionized $NH_4OH$. This residual ammonium hydroxide becomes partly ionized, thus introducing surplus hydroxyl ions effecting a pH shift into the alkaline range. Under alkaline conditions un-ionized $NH_4OH$ is less stable and $NH_3$ is released as a free gas readily detected by its characteristic odor. The shift of pH into alkaline range is usually accompanied by formation of black oxide.

A shift to the alkaline side is also favored by the formation of hydroxyl ions in the reaction of dissolved oxygen with water in the presence of iron, according to the following equation:

(21) $O_2 + 2H_2O + 2Fe \rightarrow 4\overset{-}{OH} + 2Fe^{++}$

The working of the present invention is typified by the illustrative example described hereinbelow in reference to the appended drawing, in which:

Figure I is a diagrammatic plan view of a field and accessory apparatus.

Figure II is an enlarged transverse cross-sectional view, with parts in elevation, taken along the line II—II of Figure I.

Figure III is an enlarged fragmentary cross-sectional view, with parts in elevation, taken along the line III—III of Figure I.

As shown on the drawing:

An installation for operation according to the present invention is illustrated in Figure I and includes generally three fields 10 arranged in parallel which are connected in series with a settling sump 11 and an overflow tank 12 by means of a pipeline 13 through which liquid may be circulated by a pump 14. More particularly, one end of the pipe line 13 has three branches 15 adapted to drain the fields through gates 16, while from the other end of the pipe line six pipes 17 branch off and terminate in spray nozzles 18 disposed in double series above each field. The overflow tank 12 may be bypassed by means of a pipe 19. Valves V are provided in all the pipes for controlling the flow of liquid therethrough.

The installation further includes a storage space 22 for reacted field sponge as well as an assembly of apparatus indicated generally by the reference numeral 23 for treating the field sponge to isolate its ferric hydrate content.

The apparatus for treating the field sponge includes a tub 24 provided with agitator paddles 25 and a sump 26 for wash water arranged to discharge into the tub 24 through a pipe 27. The tub 24 may be discharged through a conduit 28 onto a coarse screen conveyor 29. A tank 30 disposed underneath the conveyor 29 discharges into a continuous filter 31. The liquid effluent from the filter is returned to the sump 26 through a pipe 32 by a pump 33. The pipes 27 and 32 are provided with valves V.

As shown in greater detail in Figure 2, each field 10 comprises a pitched surface 35 surrounded by walls 36 of concrete about two feet high, the whole field projecting but slightly above the ground level 37. The drain gates 16 are, of course, disposed at the lowest point of each field.

As shown in Figure 3, the settling sump 11 is provided with transverse baffles 40.

The installation described hereinabove is operated as follows

Iron ground to 50 mesh or finer is mixed with wood shavings or saw dust and spread over the fields as a layer having an average depth of from 6 to 12 inches. The mixture is thoroughly moistened with ferrous ammonium sulfate liquor added in amounts such that a liquid layer about 2 inches deep will collect on the bottom of the fields. This liquid level is indicated in Figure 2 by the reference numeral 42. The field is then plowed or agitated so as to continually present a partially oxidized surface to the atmosphere. The rippled top surface of the sponge is indicated in Figure 2 with the reference numeral 43 while the iron itself is designated by the reference numeral 44. Additional liquid is added as needed, the sponge being maintained in a more or less gelatinous condition. A saving in liquor salts is effected by the circulating system including the pipe line 13 and pump 14 together with the settling tank 11 in which surplus drainage water is collected for return to the fields, wood shavings and the like separating therein ahead of the pump. The overflow tank 12 takes care of excess water due to rain.

An effective concentration of 3 percent or higher, by weight, of ferrous ammonium sulfate is required for positive results. Higher salt concentrations will naturally be more effective to secure adequate buffer control at all times. Actual quantities of salts added are determined by the needs of the individual installation, depending on the amount of liquor lost and the recirculation rate employed. Daily pH checks will aid in determining actual field conditions, and excess ferrous sulfate will have to be added from time to time as the pH rises above 6. The normal operating pH will be approximately 5.8 and should preferably always be maintained between the limits of 5.5 and 6.5. With due attention to proper moisture and salt control, a good grade of field sponge having a uniformly high degree of activity can be produced consistently.

The iron content of a fresh charge of field sponge may be varied considerably, as high as 25 pounds of iron per bushel having been oxidized successfully in cool weather. In general, when lower iron concentrations are used the heat is more easily controlled and the curing period can be shortened by several days. Standard practice is to use 20 pounds of 50 mesh or finer iron per bushel of shavings which produces a finished field sponge containing approximately 60 percent $Fe_2O_3$ on a dry basis. Heavier iron concentration sometimes effect cost savings, for such concentration make it possible to produce a greater quantity of ferric hydroxide in a given unit with a minimum of equipment and labor. It is often desirable to admix a certain quantity of sawdust with the shavings to aid in dispersing the iron, particularly when heavy iron concentrations are oxidized.

The fineness of the iron in the field sponge is an important factor in determining the length of time required for curing as well as the quantity of heat evolved and the rate of heat evolution. The finer the iron the more difficult it will be to control the temperature during the early stages of oxidation. However, fine iron will expose a greater surface area to the atmosphere and will consequently produce more ferric hydrate in a unit period of time. In the case of 50 mesh iron approximately 14 to 16 days are required to effect a 90 percent conversion to oxide.

The importance of moisture control has been referred to hereinabove. An acute condition is likely to arise when overheating occurs for the reaction rate is increased as the temperature rises. Evaporation of surface moisture becomes excessive and dehydration of the product is apt to set in. Unless a temperature drop is brought about quickly, a crystalline or reduced form of oxide will be formed. Adequate counter-measures include continuous sprinkling or allowing an excess of solution to accumulate at the bottom of the fields. In most cases, it is not necessary to employ continuous sprinkling, which step is preferably avoided since it slows up the adsorption of oxygen. The undesirable effects discussed are most likely to be encountered during the early stages of operation. No trouble is generally encountered after the first eight days.

In general, the atmospheric oxygen required for the oxidation of the ferrous hydrate is best introduced into the system through a relatively thin film of moisture on the immediate surface of the field sponge. Continuous sprinkling does not favor the establishment of such films, which are formed, however, when only enough moisture is added to the field sponge to keep the same in a cool, gelatinous, hydrous condition, the preferred temperature ranging from 50° to 80° C.

The reaction may appear to be rather slow during the first twelve hours after the field is laid, but thereafter a gradual rise in temperature is observed. After about 36 hours the sponge assumes a reddish tinge. The sponge is also coated with a characteristic silvery surface film which is usually formed in the presence of ammonium salts. The drainage water will be colored a dark green or blue by colloidal ferrous hydrate on which after long standing a yellow scum of ferric hydrate will collect. As the oxidation advances the sponge may turn lighter brown in color because of the high degree of hydration effected as the evolution of heat subsides. The field sponge will generally turn darker after the first week if there is a tendency for the buffer salts to be leached out. This darkening may be counteracted by the addition of solid ferrous and ammonium sulfates or recirculated water. A daily check of the pH of the field sponge will enable the operator to detect dangerous tendencies before visible effects have occurred. If the sponge is maintained at a pH of 6 or less it will be virtually impossible for side reactions to set in. A more definite check on field conditions can be had by testing for ferrous sulfate with potassium ferricyanide. A gelatinous or soggy condition will develop after several days due to a copious formation of ferric hydrate. This material will aid greatly in the retention of moisture, for ferric hydrate can absorb several times its own weight of water.

The final product is removed from the fields to a storage space 22 where it is kept until needed, when it is washed in the tub 24 to remove the oxide from the shavings. The agitator 25 stirs the mixture of field sponge and water to form a slurry of oxide, shavings and residual iron which is discharged onto the coarse screen conveyor 29 which separates the oxide from the coarse matter which is carried away on the wire screen. The oxide passes through the screen into the tank 30 from which it is pumped, in slurry form, to the continuous filter 31. A filter cake of the final product is indicated by the reference numeral 45. The ferric hydrate obtained will analyze approximately 80 percent $Fe_2O_3$ on a dry basis or about 40 percent $Fe_2O_3$ as it comes out of the filter press. It can be shipped in moist state as obtained from the filter press if to the water used in the initial scrubbing of the field sponge there is added 2 to 5 percent soda ash to alkalinize the material.

The scrubbing solution can be employed in closed circuit to wash successive batches of field sponge. The shavings and unoxidized iron separated may be incorporated with a new charge of fine iron and returned to the field for a new oxidation cycle.

The process described hereinabove can be relied upon to produce a high grade purification oxide satisfactory for all present day applications involving natural gas, or manufactured gas or process gas used in other industrial processes, from which gases even extremely diluted hydrogen sulfide must be removed. Among the specific applications of the ferric hydrate may be mentioned the purification of domestic gas whose maximum hydrogen sulfide content is fixed by law. Gas used in operations such as annealing or hydrogenation of oils and fats for food purposes must also have all traces of hydrogen sulfide removed. The highly active oxide prepared according to the present invention permits removal of traces of hydrogen sulfide with a minimum of material and equipment. Multi-series box installations and frequent box changes or revivifying cycles required in connection with the oxide prepared by prior art methods are not necessary. The use of catalytic aids boosting the performance of poorly operating boxes can be dispensed with. The hydrogen sulfide adsorption of a ferric hydrate prepared according to the present invention and that of one prepared according to the prior art method described in the beginning of this application are tabulated hereinbelow:

| Cubic feet of gas purified | Grains of $H_2S$ removed per 100 cubic feet | |
|---|---|---|
| | Old hydrate | New hydrate |
| 5 | 400 | 400 |
| 10 | 400 | 400 |
| 15 | 380 | 400 |
| 20 | 360 | 400 |
| 25 | 340 | 400 |
| 30 | 328 | 400 |
| 35 | 317 | 400 |
| 40 | 300 | 398 |
| 45 | 288 | 391 |
| 50 | 278 | 384 |
| 55 | 263 | 360 |
| 60 | 243 | 330 |
| 65 | 222 | 303 |
| 70 | 200 | 274 |

Other factors than the presence of various amounts of moisture, the pH of the moisture, the amount of oxygen being adsorbed, and the fineness of the iron will influence the rate of reaction and the nature of the product. Among these factors may be mentioned the following:

The presence or absence in the iron of impurities such as graphite, sulfides and slag which act as cathodes to accelerate corrosion.

The presence or absence of ionic compounds which improve the electrical conductivity of the sponge, thereby aiding corrosion.

The presence or absence of strains or minute cracks or rough surfaces in the iron which produce anodic surfaces at the bottom of each depression since oxygen gas diffusing through the solution will become more dilute as it penetrates deeper, being consumed while penetrating.

The presence or absence of factors effecting movement of the water which would bring oxygen more rapidly to the cathodic surfaces and remove ferrous ions from anodic areas, thus preventing accumulations of ferrous ions in these areas.

Local variations in concentration which set up currents accelerating electrolytic corrosion.

Alternate wetting or drying which disrupts films of oxide or rust to induce renewed oxidation.

The presence or absence of substances like citric and oxalic acids which form complex ions with the metal ions to decrease the concentration of the latter and thereby, according to the law of mass action, increase the rate of corrosion.

The presence or absence of ions such as chloride or bromide ions which work their way through passivating hydrogen films to destroy passivity of the metal.

Factors such as those listed in the preceding paragraphs will effect changes in rate of reaction and nature of the final product that will have to be considered, along with local climatic conditions and the characteristics of each specific field, in controlling the oxidation process of the present invention, which is not limited to the illustrative example described hereinabove but includes broadly the method of treating moist iron or iron compounds to prepare ferric hydrate including maintaining a pH value of from 4.3 to 7.0 by any and all means. It is therefore not my intention to limit the patent granted on this invention otherwise than as necessitated by the scope of the appended claims.

I claim as my invention:

1. In the field method of preparing by atmospheric corrosion of moist finely divided metallic iron a ferric hydrate material useful for removal of hydrogen sulfide from fluid media, the improvement comprising maintaining in said moisture a concentration of material selected from the group consisting of ferrous ammonium sulfate and of a mixture of ferrous sulfate and a sulfate of an organic amine base such that said moisture will have a pH value ranging from 4.3 to 7.0 throughout said corrosion.

2. In the field method of preparing by atmospheric corrosion of moist finely divided metallic iron a ferric hydrate material useful for removal of hydrogen sulfide from fluid media, the improvement comprising maintaining in said moisture a concentration of ferrous ammonium sulfate such that said moisture will have a pH value ranging from 4.5 to 6.5 throughout said corrosion.

3. In the field method of preparing by atmospheric corrosion of moist finely divided metallic iron a ferric hydrate material useful for removal of hydrogen sulfide from fluid media, the improvement comprising maintaining in said moisture a concentration of ferrous ammonium sulfate such that said moisture will have a pH value ranging from 5.5 to 6.5 throughout said corrosion.

4. In the field method of preparing by atmospheric corrosion of moist finely divided metallic iron a ferric hydrate material useful for removal of hydrogen sulfide from fluid media, the improvement comprising incorporating with said iron ammonium sulfate and ferrous sulfate in amounts such that said moisture will have a pH value ranging from 4.3 to 7.0 throughout said corrosion.

5. In the field method of preparing by atmospheric corrosion of moist finely divided metallic iron a ferric hydrate material useful for removal of hydrogen sulfide from fluid media, the improvement comprising incorporating with said iron ammonium sulfate and ferrous sulfate in amounts such that said moisture will have a pH value ranging from 4.3 to 7.0 throughout said corrosion.

6. In the field method of preparing by atmospheric corrosion of moist finely divided metallic iron a ferric hydrate material useful for removal of hydrogen sulfide from fluid media, the improvement comprising incorporating with said iron ferrous ammonium sulfate in amounts such as to maintain in said moisture a ferrous sulfate content large enough to be detectable by a test with potassium ferricyanide.

7. In the field method of preparing by atmospheric corrosion of moist finely divided metallic iron a ferric hydrate material useful for removal of hydrogen sulfide from fluid media, the improvement comprising incorporating with said iron ammonium sulfate and ferrous sulfate in amounts such that said moisture will have a pH value ranging from 4.5 to 6.5 throughout said corrosion and agitating the field to expose the iron freely to the atmosphere.

8. In the field method of preparing by atmospheric corrosion of moist finely divided metallic iron a ferric hydrate material useful for removal of hydrogen sulfide from fluid media, the improvement comprising incorporating with said iron ammonium sulfate and ferrous sulfate in amounts such that said moisture will have a pH value ranging from 4.5 to 6.5 throughout said corrosion and sprinkling water on said field iron as required to maintain a field temperature of from 50° to 80° C. during said atmospheric corrosion.

9. In the field method of preparing by atmospheric corrosion of moist finely divided metallic iron a ferric hydrate material useful for removal of hydrogen sulfide from fluid media, the improvement which comprises incorporating with said iron ammonium sulfate and ferrous sulfate in amounts at least equal to three percent by weight of said field iron, recirculating the resulting ferrous ammonium sulfate solution through said field iron, and replenishing the ferrous ammonium sulfate content of said solution as required to maintain therein a pH value of from 4.5 to 6.5.

10. In the field method of preparing by atmospheric corrosion of moist finely divided metallic iron a ferric hydrate material useful for removal of hydrogen sulfide from fluid media, the improvement which comprises maintaining in said moisture throughout said corrosion a pH value of from 4.3 to 7.0 and after completion of said corrosion alkalinizing the resulting ferric hydrate while still moist to render the same stable in moist condition.

11. In the field method of preparing by atmospheric corrosion of finely divided iron distributed throughout a moist subdivided solid carrier medium a ferric hydrate material useful for removal of hydrogen sulfide from fluid media, the improvement comprising incorporating with said moisture ammonium sulfate and ferrous sulfate in amounts such as to maintain in said moisture a pH value ranging from 4.5 to 6.5 whereby the formation of black magnetic oxide of iron is avoided.

WILLIAM E. MAREK.